(12) United States Patent
Ruehmann et al.

(10) Patent No.: US 8,726,743 B2
(45) Date of Patent: May 20, 2014

(54) SHOULDER YIELDING DETECTION DURING TUBULAR MAKEUP

(75) Inventors: Rainer Ruehmann, Hannover (DE); Graham Myles Ruark, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 73 days.

(21) Appl. No.: 13/460,924

(22) Filed: May 1, 2012

(65) Prior Publication Data

US 2012/0325017 A1 Dec. 27, 2012

Related U.S. Application Data

(60) Provisional application No. 61/499,984, filed on Jun. 22, 2011.

(51) Int. Cl.
*B25B 23/14* (2006.01)

(52) U.S. Cl.
USPC .......................................... 73/862.21; 73/761

(58) Field of Classification Search
USPC .............................................. 73/761, 862.21
See application file for complete search history.

(56) References Cited

U.S. PATENT DOCUMENTS

| | | | |
|---|---|---|---|
| 3,368,396 A | 2/1968 | VanBurkleo et al. |
| 3,594,587 A | 7/1971 | Martens et al. |
| 3,745,820 A | 7/1973 | Weiner |
| 3,855,857 A | 12/1974 | Claycomb |
| 4,008,773 A | 2/1977 | Wallace et al. |
| 4,091,451 A | 5/1978 | Weiner et al. |
| 4,106,176 A | 8/1978 | Rice et al. |
| 4,176,436 A | 12/1979 | McCombs et al. |
| 4,365,402 A | 12/1982 | McCombs et al. |
| 4,402,052 A | 8/1983 | Stone et al. |
| 4,404,559 A | 9/1983 | Renner |
| 4,592,125 A | 6/1986 | Skene |
| 4,709,182 A | 11/1987 | Wenske et al. |
| 4,715,451 A | 12/1987 | Bseisu et al. |
| 4,867,236 A | 9/1989 | Haney et al. |
| 4,875,530 A | 10/1989 | Frink et al. |
| 5,130,700 A | 7/1992 | Annis et al. |
| 5,205,163 A | 4/1993 | Sananikone |

(Continued)

FOREIGN PATENT DOCUMENTS

GB 2115940 A 9/1983

OTHER PUBLICATIONS

OTC 21874; Shoulder Yielding Detection During Pipe Makeup; Rainer Rühmann, Weatherford Oil Tool GmbH Hanover; Graham Ruark, Weatherford International Ltd.; Copyright 2011, Offshore Technology Conference.

(Continued)

*Primary Examiner* — Max Noori
(74) *Attorney, Agent, or Firm* — Patterson & Sheridan, L.L.P.

(57) ABSTRACT

A method of connecting a first threaded tubular to a second threaded tubular includes: engaging threads of the tubulars; and rotating the first tubular relative to the second tubular, thereby making up the threaded connection. The method further includes, during makeup of the threaded connection: detecting a shoulder position; and after detection of the shoulder position, monitoring for potential yielding of the threaded connection. The method further includes terminating the makeup according to: a first criterion in response to detection of the potential yielding; or a second criterion in response to absence of the potential yielding.

20 Claims, 8 Drawing Sheets

(56) References Cited

U.S. PATENT DOCUMENTS

| | | |
|---|---|---|
| 5,245,265 A | 9/1993 | Clay |
| 5,245,877 A | 9/1993 | Ruark |
| 5,272,925 A | 12/1993 | Henneuse et al. |
| 5,315,501 A | 5/1994 | Whitehouse |
| 5,402,688 A | 4/1995 | Okada et al. |
| 5,637,968 A | 6/1997 | Kainec et al. |
| 5,689,871 A | 11/1997 | Carstensen |
| 6,241,032 B1 | 6/2001 | Falgout, Sr. |
| 6,374,706 B1 | 4/2002 | Newman |
| 6,516,896 B1 | 2/2003 | Bookshar et al. |
| 6,536,520 B1 | 3/2003 | Snider et al. |
| 6,662,110 B1 | 12/2003 | Bargach et al. |
| 6,814,149 B2 | 11/2004 | Liess et al. |
| 7,028,585 B2 | 4/2006 | Pietras et al. |
| 7,044,238 B2 | 5/2006 | Hutchinson |
| 7,073,598 B2 | 7/2006 | Haugen |
| 7,100,698 B2 | 9/2006 | Kracik et al. |
| 7,210,710 B2 * | 5/2007 | Williamson et al. .......... 285/333 |
| 7,286,623 B2 | 10/2007 | Whetsel |
| 7,294,608 B2 | 11/2007 | Oldiges et al. |
| 7,296,623 B2 | 11/2007 | Koithan et al. |
| 7,306,054 B2 | 12/2007 | Hutchinson |
| 7,318,488 B2 | 1/2008 | Hutchinson |
| 7,435,088 B2 * | 10/2008 | Brajnovic ..................... 433/173 |
| 7,568,522 B2 * | 8/2009 | Boutwell et al. ......... 166/250.01 |
| 7,588,099 B2 | 9/2009 | Kracik |
| 7,594,540 B2 | 9/2009 | Koithan et al. |
| 7,707,913 B2 | 5/2010 | Halse |
| 7,757,759 B2 | 7/2010 | Jahn et al. |
| 7,882,902 B2 | 2/2011 | Boutwell, Jr. |
| 2003/0164276 A1 | 9/2003 | Snider et al. |
| 2003/0178847 A1 | 9/2003 | Galle et al. |
| 2009/0151934 A1 | 6/2009 | Heidecke et al. |
| 2009/0266539 A1 | 10/2009 | Ruark et al. |
| 2009/0274545 A1 | 11/2009 | Liess et al. |

OTHER PUBLICATIONS

PCT International Search Report and Written Opinion dated Apr. 12, 2013, International Application No. PCT/US2012/036173.
Tenaris Hydril—Make-up Acceptance Criteria, Sep. 1, 2010, retrieved from the Internet: URL:http://www.tenaris.com/~/media/Files/ProductLiterature/LiteraturePremiumConnections/RM6__Makeup_AcceptanceCriteria_ENGLISH1.ashx, retrieved on Apr. 3, 2013, 10 pages.
Xie—Analysis of Strain Rate Impact on Makeup of Oilfield Premium Casing Connections, May 17, 2011, retrieved from the Internet: URL:http://www.simulia-china.com/download/global/2011/Xie__strain.pdf, retrieved on Apr. 3, 2013.

* cited by examiner

SHOULDER YIELDING DETECTION DURING TUBULAR MAKEUP

CROSS-REFERENCE TO RELATED APPLICATIONS

This application claims benefit of U.S. provisional Pat. App. No. 61/499,984, filed Jun. 22, 2011, which is herein incorporated by reference in its entirety.

Applicant's paper OTC 21874 titled "Shoulder Yielding Detection During Pipe Makeup" and presented at the Offshore Technology Conference held in Houston, Tex. from May 2 to May 5, 2011 is herein incorporated by reference in its entirety.

BACKGROUND OF THE INVENTION

1. Field of the Invention

Embodiments of the present invention generally relate to a method for detecting yielding of a shoulder during tubular makeup.

2. Description of the Related Art

In wellbore construction and completion operations, a wellbore is formed to access hydrocarbon-bearing formations (e.g., crude oil and/or natural gas) by the use of drilling. Drilling is accomplished by utilizing a drill bit that is mounted on the end of a drill support member, commonly known as a drill string. To drill within the wellbore to a predetermined depth, the drill string is often rotated by a top drive or rotary table on a surface platform or rig, or by a downhole motor mounted towards the lower end of the drill string. After drilling to a predetermined depth, the drill string and drill bit are removed and a section of casing is lowered into the wellbore. An annulus is thus formed between the string of casing and the formation. The casing string is temporarily hung from the surface of the well. A cementing operation is then conducted in order to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

A drilling rig is constructed on the earth's surface or floated on water to facilitate the insertion and removal of tubular strings (e.g., drill pipe, casing, sucker rod, riser, or production tubing) into a wellbore. The drilling rig includes a platform and power tools, such as an elevator and slips, to engage, assemble, and lower the tubulars into the wellbore. The elevator is suspended above the platform by a draw works that can raise or lower the elevator in relation to the floor of the rig. The slips are mounted in the platform floor. The elevator and slips are each capable of engaging and releasing a tubular and are designed to work in tandem. Generally, the slips hold a tubular or tubular string that extends into the wellbore from the platform. The elevator engages a tubular joint and aligns it over the tubular string being held by the slips. One or more power drives, e.g. a power tong and a spinner, are then used to thread the joint and the string together. Once the tubulars are joined, the slips disengage the tubular string and the elevator lowers the tubular string through the slips until the elevator and slips are at a predetermined distance from each other. The slips then reengage the tubular string and the elevator disengages the string and repeats the process. This sequence applies to assembling tubulars for the purpose of drilling, deploying casing or deploying other components into the wellbore. The sequence is reversed to disassemble the tubular string.

SUMMARY OF THE INVENTION

Embodiments of the present invention generally relate to a method for detecting yielding of a shoulder during tubular makeup. In one embodiment, a method of connecting a first threaded tubular to a second threaded tubular includes: engaging threads of the tubulars; and rotating the first tubular relative to the second tubular, thereby making up the threaded connection. The method further includes, during makeup of the threaded connection: detecting a shoulder position; and after detection of the shoulder position, monitoring for potential yielding of the threaded connection. The method further includes terminating the makeup according to: a first criterion in response to detection of the potential yielding; or a second criterion in response to absence of the potential yielding.

In another embodiment, a tubular makeup system includes: a power drive operable rotate a first threaded tubular relative to a second threaded tubular; a torque cell; a turns counter; and a programmable logic controller (PLC) operably connected to the power drive and in communication with the torque cell and turns counter. The PLC is configured to control an operation including: engaging threads of the tubulars; and rotating the first tubular relative to the second tubular, thereby making up the threaded connection. The operation further includes, during makeup of the threaded connection: detecting a shoulder position; and after detection of the shoulder position, monitoring for potential yielding of the threaded connection. The operation further includes terminating the makeup according to: a first criterion in response to detection of the potential yielding; or a second criterion in response to absence of the potential yielding.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
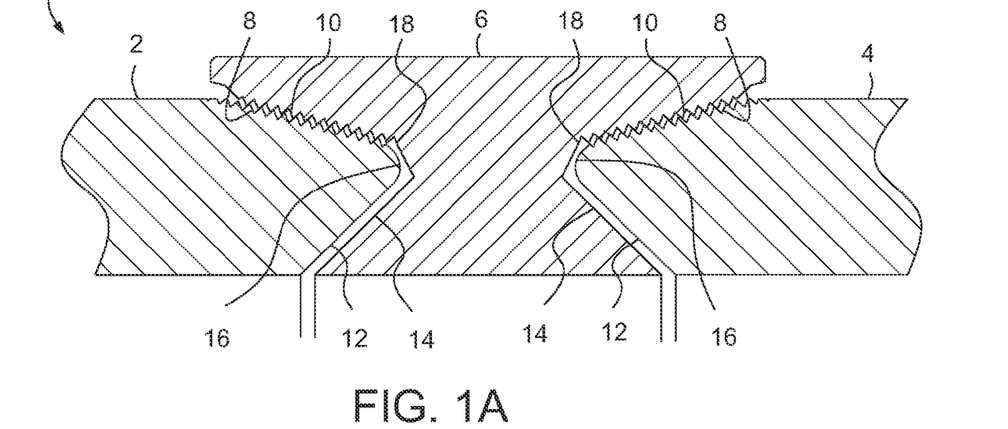
FIG. 1A is a partial cross section view of a connection between threaded premium grade tubulars.

FIG. 1A illustrates a connection 1 between premium grade tubulars 2, 4. The tubulars 2, 4 may be any oil country tubular good, such as production tubing, casing, liner, or drill pipe. The connection 1 may include a first tubular 2 joined to a second tubular 4 through a tubular coupling or box 6. The end of each tubular 2, 4 may have a tapered externally-threaded surface 8 (aka a pin) which co-operates with a correspondingly tapered internally-threaded surface 10 on the coupling 6. Each tubular 2, 4 may be provided with a torque shoulder 12 which co-operates with a corresponding torque shoulder 14 on the coupling 6. At a terminal end of each tubular 2, 4, there may be defined an annular sealing area 16 which is engageable with a co-operating annular sealing area 18 defined between the tapered portions 10, 14 of the coupling 6. Alternatively, the sealing area 16 may be located at other positions in the connection than adjacent the shoulder 12.

Figure 1B:
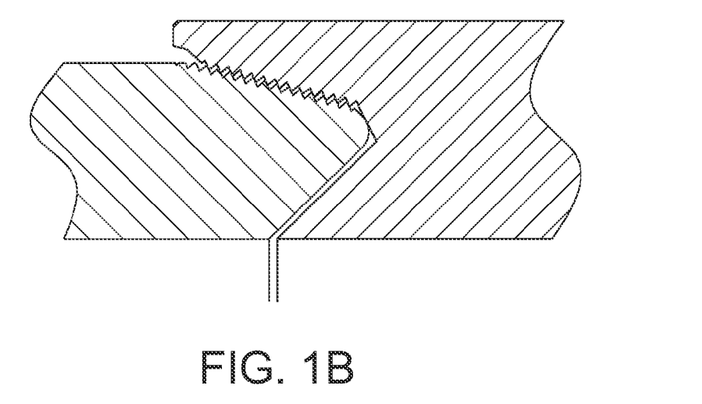
FIG. 1B is a partial cross section view of a connection between threaded premium grade tubulars in which a seal condition is formed by engagement between sealing surfaces.
Figure 1C:
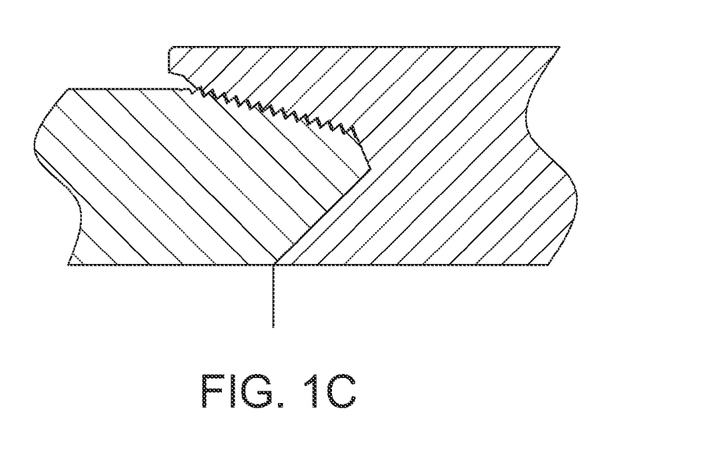
FIG. 1C is a partial cross section view of a connection between threaded premium grade tubulars in which a shoulder condition is formed by engagement between shoulder surfaces.

During makeup, the pin 8 is engaged with the box 6 and then screwed into the box by relative rotation therewith. During continued rotation, the annular sealing areas 16, 18 contact one another, as shown in FIG. 1B. This initial contact is referred to as the "seal condition". As the tubulars 2, 4 are further rotated, the co-operating tapered torque shoulders 12, 14 contact and bear against one another at a machine detectable stage referred to as a "shoulder position", as shown in FIG. 1C. The increasing pressure interface between the tapered torque shoulders 12, 14 cause the seals 16, 18 to be forced into a tighter metal-to-metal sealing engagement with each other causing deformation of the seals 16 and eventually forming a fluid-tight seal.

Figure 2A:
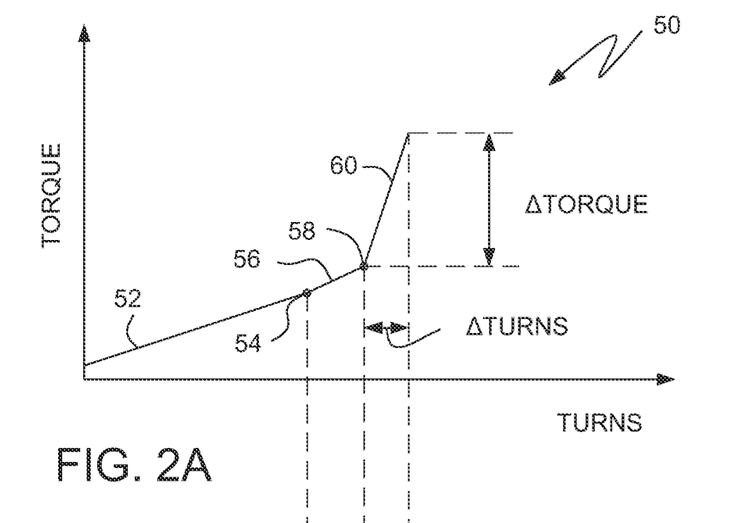
FIG. 2A illustrate a plot of torque with respect to turns for the premium connection.
Figure 2B:
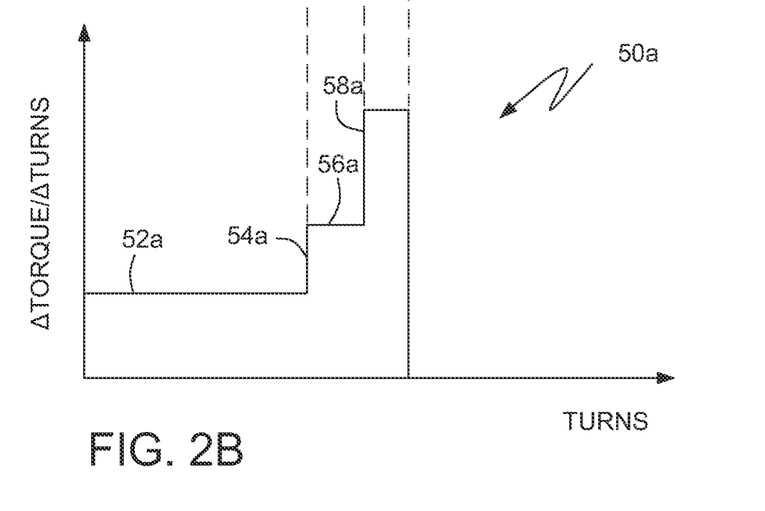
FIG. 2B illustrates plots of the rate of change in torque with respect to turns for the premium connection.

During makeup of the tubulars 2, 4, torque may be plotted with respect to turns. FIG. 2A shows a typical x-y plot (curve 50) illustrating the acceptable behavior of the premium connection 1 shown in FIGS. 1A-1C. FIG. 2B shows a corresponding chart plotting the rate of change in torque (y-axis) with respect to turns (x-axis). Shortly after the tubulars engage one another and torque is applied, the measured torque increases substantially linearly as illustrated by curve portion 52. As a result, corresponding curve portion 52a of the differential curve 50a is flat at some positive value.

During continued rotation, the annular sealing areas 16, 18 contact one another causing a slight change (specifically, an increase) in the torque rate, as illustrated by point 54. Thus, point 54 corresponds to the seal condition shown in FIG. 1B and is plotted as the first step 54a of the differential curve 50a. The torque rate then again stabilizes resulting in the linear curve portion 56 and the plateau 56a. In practice, the seal condition (point 54) may be too slight to be detectable. However, in a properly behaved makeup, a discernable/detectable change in the torque rate occurs when the shoulder position is achieved (corresponding to FIG. 1C), as represented by point 58 and step 58a.

Figure 3A:
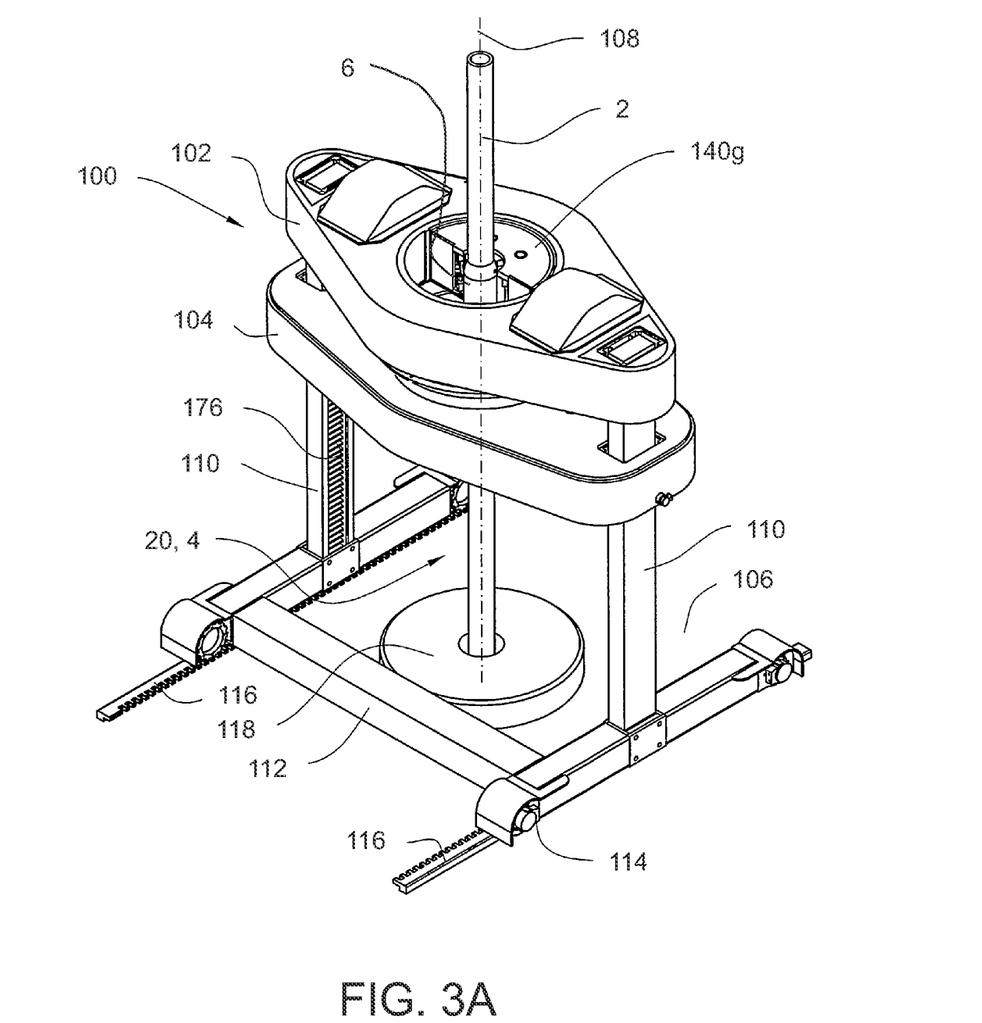
FIG. 3A is a perspective view of a tong assembly in an upper position.

FIG. 3A is a perspective view of a power drive, such as tong assembly 1, in an upper position. A group 140g of clamps has been removed for illustrative purposes. The tong assembly 100 may include a power tong 102 and a back-up tong 104 located on a drilling rig 106 coaxially with a drilling center 108 of the drilling rig 106. The assembly 100 may be coupled in a vertically displaceable manner to one or more guide columns 110 (two shown) arranged diametrically opposite each other relative to the drilling centre 108. The guide columns 110 may be connected to a chassis 112 which by wheels 114 and hydraulic motors (not shown) may be displaced horizontally on rails 116 connected to the drilling rig 106. In the operative position, the assembly 100 may be located immediately above the slips 118 of the drilling rig 106.

The power tong 102 may include a power tong housing provided with a through aperture that corresponds to the guide columns 110, and an undivided drive ring connected via a bearing ring (not shown). The bearing ring may have a toothed ring (not shown) in mesh with cogwheels (not shown) on one or more hydraulic motors (not shown), such as two. One of the motors may be a spinner motor (high speed, low torque) and the other motor may be one or more torque motors (high torque, low speed). The toothed ring may be coupled to the drive ring by screw-bolt-joints (not shown). The hydraulic motors may be arranged to rotate the drive ring about the drilling centre 108. The two hydraulic motors may be disposed on diametrically opposite sides of the drive ring. A cover may be provided to cover the power tong housing.

In the drive ring and co-rotating with this may be two crescent-shaped groups 140g (only one shown) of clamps. Each group 140g of clamps may be provided with one or more, such as three, clamps distributed around the drilling center 108. Each clamp may include a cylinder block provided with one or more, such as three, cylinder bores arranged in a vertical row. In each cylinder bore may be a corresponding longitudinally displaceable piston that seals against the cylinder bore by a piston gasket. A rear gasket may prevent pressurized fluid from flowing out between the piston and the cylinder bore at the rear end of the piston.

The pistons may be fastened to the housing of the group 140g of clamps by respective screw-bolt-joints. On the part of the cylinder block facing the drilling center 108 there may be provided a gripper. The gripper may be connected to the cylinder block by fastening, such as with dovetail grooves or screw-bolt-joints (not shown). Surrounding the drive ring there may be provided a swivel ring that seals by swivel gaskets, the swivel ring may be stationary relative to the power tong housing. The swivel ring may have a first passage that communicates with the plus side of the pistons via a first fluid connection, a second passage that communicates with the minus side of the pistons via a second fluid connection, and a further passage. The cylinder and the piston may thereby be double acting. The swivel ring, swivel gaskets and drive ring may together form a swivel coupling.

The backup tong 104 may also include the clamp groups. The back-up tong 104 may further include a back-up tong housing with guides 176 that correspond with the guide columns 110, and a retainer ring for two groups of clamps. At the guides 176 there may be cogwheels that mesh with respective pitch racks of the guide columns 110. Separate hydraulic motors may drive the cogwheels via gears. A pair of hydraulic cylinders may be arranged to adjust the vertical distance between the power tong 102 and the back-up tong 104.

In operation, when a tubular joint 2 is to be added to tubular string 20 (already including tubular joint 4), the assembly 100 may be displaced vertically along the guide columns 110 by the hydraulic motors, the gears, the cogwheels and the pitch racks until the back-up tong 104 corresponds with the pin 8 of the tubular string 20. The box 6 may have been made up to the pin 8 of the joint 2 offsite (aka bucking operation) before the tubulars 2, 4 are transported to the rig. Alternatively the box 6 may be bucked on the joint 4 instead of the joint 2. Alternatively, the box 6 may be welded to one of the tubulars 2, 4 instead of being bucked on.

The vertical distance between the back-up tong 104 and the power tong 102 may be adjusted so as to make the grippers correspond with the box 6. The clamps may be moved up to the box 6 by pressurized fluid flowing to the first passage in the swivel ring and on through the first fluid connection to the plus side of the pistons. The excess fluid on the minus side of the pistons may flow via the second fluid connection and the second passage back to a hydraulic power unit (not shown).

The grippers may then grip their respective pin or box while the hydraulic motors rotate the drive ring and the groups 140g of clamps about the drilling center 108, while at the same time constant pressure may be applied through the swivel ring to the plus side of the pistons. The power tong 102 may be displaced down towards the back-up tong 104 while the screwing takes place. After the desired torque has been achieved, the rotation of the drive ring may be stopped. The clamps may be retracted from the tubular string 20 by pressurized fluid being delivered to the minus side of the pistons via the swivel ring. The assembly 100 may be released from the tubular string 20 and moved to its lower position.

When a joint 2 is to be removed from the tubular string 20, the operation is performed in a similar manner to that described above. When tools or other objects of a larger outer diameter than the tubular string 20 are to be displaced through the assembly 100, the grippers may easily be removed from their respective clamps, or alternatively the groups 140g of clamps can be lifted out of the drive ring.

Alternatively, other types of tong assemblies may be used instead of the tong assembly 100.

Figure 3B:
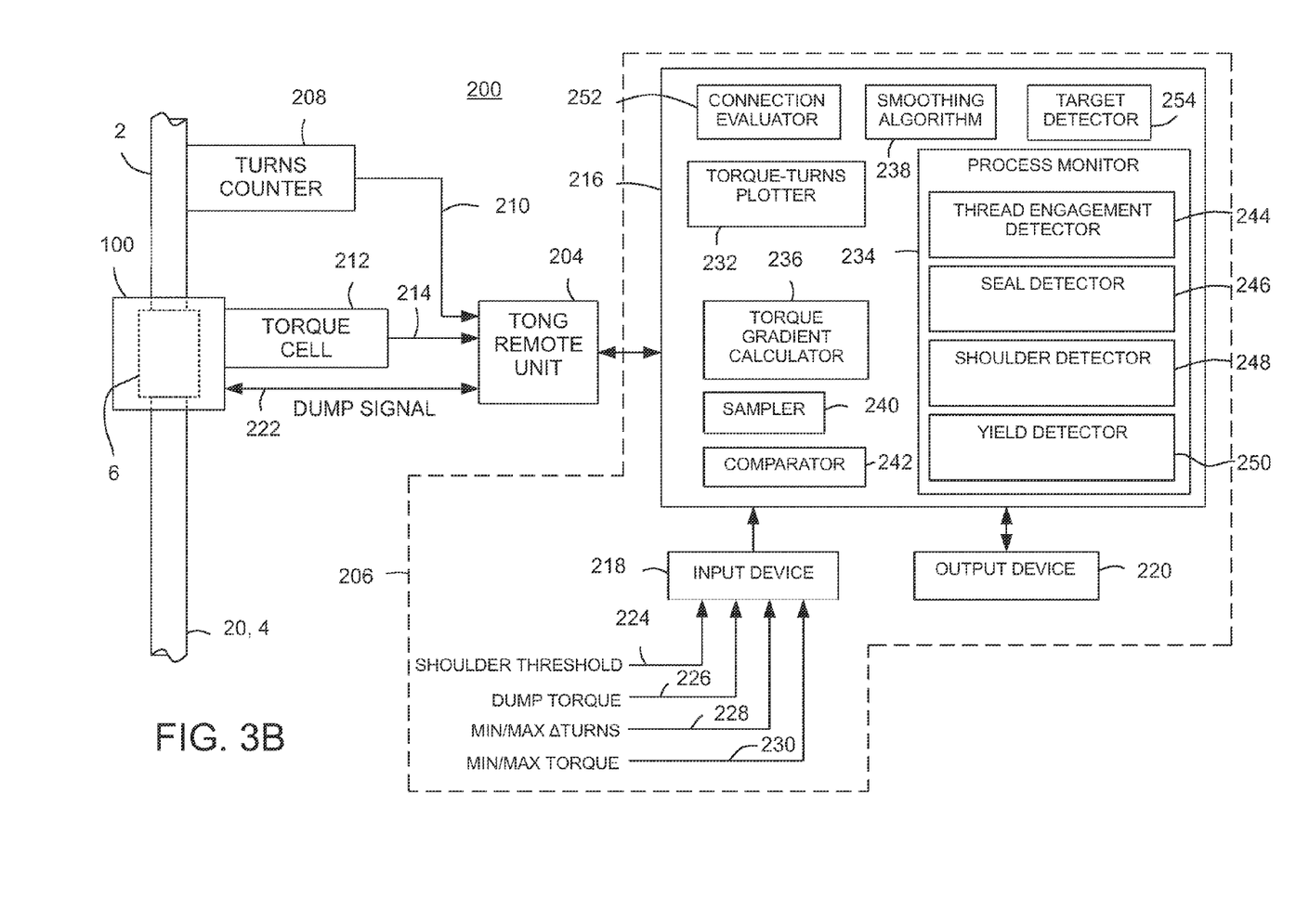
FIG. 3B is a block diagram illustrating a tubular makeup system, according to one embodiment of the present invention.

FIG. 3B is a block diagram illustrating a tubular makeup system 200, according to one embodiment of the present invention. The tubular makeup system 200 may include the tong assembly 100, a tong remote unit (TRU) 204, a turns counter 208, a torque cell 212, and the control system 206. The control system 206 may communicate with the TRU 204 via an interface. Depending on sophistication of the TRU 204, the interface may be analog or digital. Alternatively, the control system 206 may also serve as the TRU.

A programmable logic controller (PLC) 216 of the control system 206 may monitor the turns count signals 210 and torque signals 214 from the respective sensors 208, 212 and compare the measured values of these signals with predetermined values 224-230. The predetermined values 224-230 may be input by an operator for a particular connection. The predetermined values 224-230 may be input to the PLC 216 via an input device 218, such as a keypad.

Illustrative predetermined values 224-230 which may be input, by an operator or otherwise, include a shoulder threshold gradient 224, a dump torque value 226, minimum and maximum delta turns values 228, minimum and maximum torque values 230. The minimum and maximum torque values 230 may include a set for the shoulder position and a set for the final position. The torque values 230 may be derived theoretically, such as by finite element analysis, or empirically, such as by laboratory testing and/or analysis of historical data for a particular connection. The dump torque value 226 may simply be an average of the final minimum and maximum torque values 230. During makeup of the connection 1, various output may be observed by an operator on output device, such as a display screen, which may be one of a plurality of output devices 220. By way of example, an operator may observe the various predefined values which have been input for a particular connection. Further, the operator may observe graphical information such as the torque rate curve 50 and the torque rate differential curve 50a. The plurality of output devices 220 may also include a printer such as a strip chart recorder or a digital printer, or a plotter, such as an x-y plotter, to provide a hard copy output. The plurality of output devices 220 may further include a horn or other audio equipment to alert the operator of significant events occurring during makeup, such as the shoulder condition, the terminal connection position and/or a bad connection.

Upon the occurrence of a predefined event(s), the PLC 216 may output a dump signal 222 to the TRU 204 to automatically shut down or reduce the torque exerted by the tong assembly 100. For example, dump signal 222 may be issued upon detecting the final connection position and/or a bad connection.

The comparison of measured turn count values and torque values with respect to predetermined values is performed by one or more functional units of the PLC 216. The functional units may generally be implemented as hardware, software or a combination thereof. The functional units may include one or more of a torque-turns plotter algorithm 232, a process monitor 234, a torque gradient calculator 236, a smoothing algorithm 238, a sampler 240, a comparator 242, a connection evaluator 252, and a target detector 254. The process monitor 234 may include one or more of a thread engagement detection algorithm 244, a seal detection algorithm 246 a shoulder detection algorithm 248, and a yield detection algorithm 250. Alternatively, the functional units may be performed by a single unit. As such, the functional units may be considered logical representations, rather than well-defined and individually distinguishable components of software or hardware.

In operation one of the threaded members (e.g., tubular 2 and box 6) is rotated by the power tong 102 while the other tubular 4 is held by the backup tong 104. The applied torque and rotation are measured at regular intervals throughout the makeup. In one embodiment, the box 6 may be secured against rotation so that the turns count signals accurately reflect the rotation of the tubular 2. Additionally, a second turns counter (not shown) may be provided to sense the rotation of the box 6. The turns count signal issued by the second turns counter may then be used to correct (for any rotation of the box 6) the turns count signal 210.

The frequency with which torque and rotation are measured may be specified by the sampler 240. The sampler 240 may be configurable, so that an operator may input a desired sampling frequency. The torque and rotation values may be stored as a paired set in a buffer area of memory. Further, the rate of change of torque with respect to rotation (hereinafter "torque gradient") may be calculated for each paired set of measurements by the torque gradient calculator 236. At least two measurements are needed before a rate of change calculation can be made. The smoothing algorithm 238 may operate to smooth the torque gradient (e.g., by way of a running average). These values (torque, rotation, and torque gradient) may then be plotted by the plotter 232 for display on the output device 220.

The values (torque, rotation, and torque gradient) may then be compared by the comparator 242, either continuously or at selected events, with predetermined values, such as the values 224-230. Based on the comparison of the measured and/or calculated values with the predefined values 224-230, the process monitor 234 may determine the occurrence of various events and whether to continue rotation or abort the makeup. The thread engagement detection algorithm 244 may monitor for thread engagement of the pin 8 and box 6. Upon detection of thread engagement a first marker is stored. The marker may be quantified, for example, by time, rotation, torque, a derivative of torque with respect to rotation, or a combination of any such quantifications. During continued rotation, the seal detection algorithm 246 monitors for the seal condition. This may be accomplished by comparing the calculated torque gradient with a predetermined threshold seal condition value.

A second marker indicating the seal condition may be stored if/when the seal condition is detected. At this point, the torque value at the seal condition may be evaluated by the connection evaluator 252.

For example, a determination may be made as to whether the turns value and/or torque value are within specified limits. The specified limits may be predetermined, or based off of a value measured during makeup. If the connection evaluator 252 determines a bad connection, rotation may be terminated. Otherwise rotation continues and the shoulder detection algorithm 248 monitors for the shoulder position. This may be accomplished by comparing the calculated torque gradient with the shoulder threshold gradient 224. When the shoulder position is detected, a third marker indicating the shoulder position is stored. The connection evaluator 252 may then determine whether the torque value at the shoulder position is acceptable by comparing to the respective input torque values 230.

Upon continuing rotation, the target detector 254 monitors for the dump torque value 226. Once the dump torque value 226 is reached, rotation may be terminated by sending the dump signal 222. Alternatively, the dump signal 222 may be issued slightly before the dump torque 226 is reached to account for system inertia. Once the connection is complete, the connection evaluator 252 may calculate a delta turns value based on the difference between the final turns value and the turns value at the shoulder condition. The connection evaluator 252 may compare the delta turns value with the input delta turns values 228. Similarly, the connection evaluator may compare the final torque value to the respective input torque values 230. If either criteria is not met, then the connection evaluator 252 may indicate a bad connection.

Alternatively, a delta turns value may be entered instead of the dump torque 226. The target detector 254 may then calculate a target turns value using the shoulder turns and the delta turns value (target turns equals shoulder turns plus delta turns).

Figure 4A:
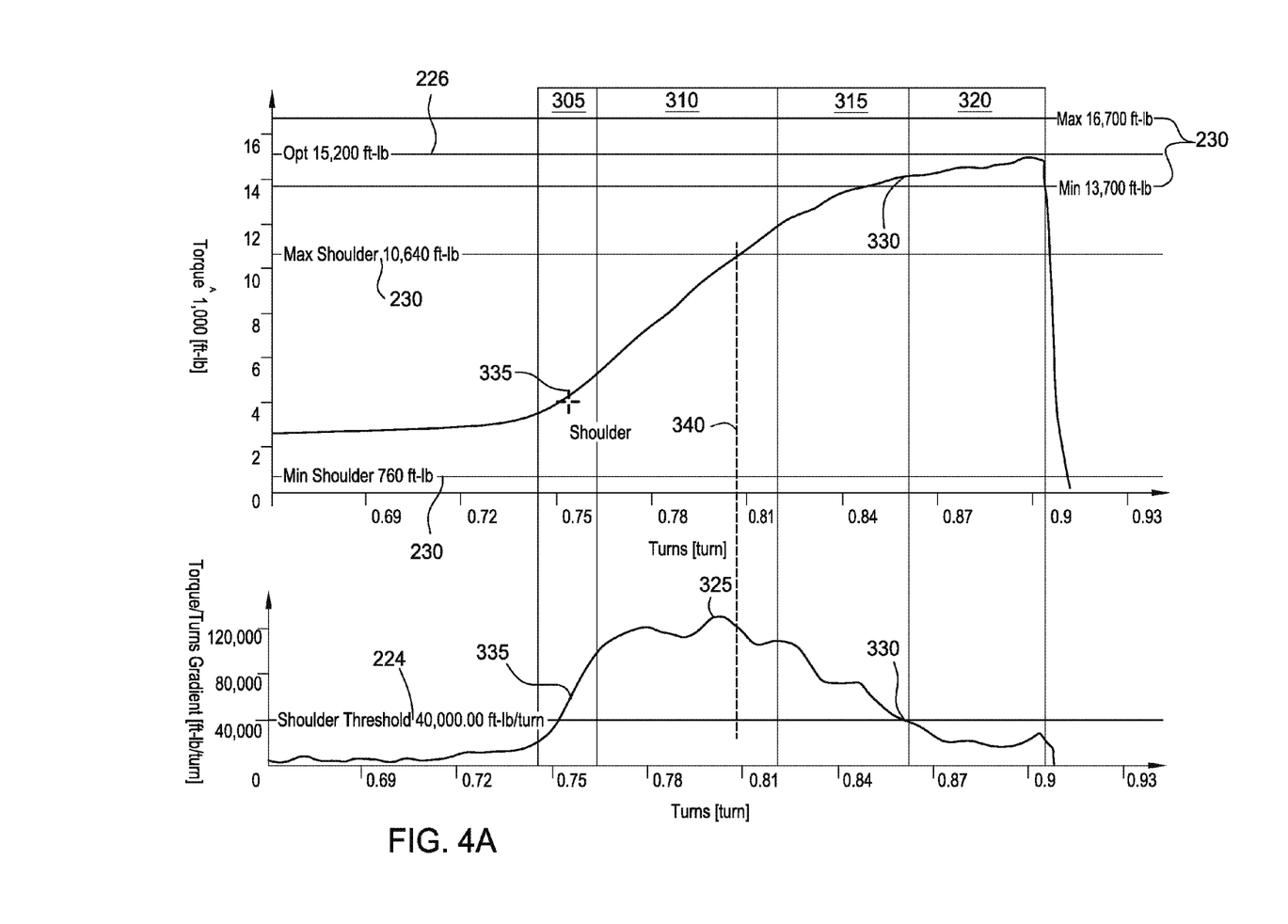
FIG. 4A illustrates yielding of a threaded premium connection.

FIG. 4A illustrates yielding of a threaded premium connection 1 (see also FIG. 5 of the OTC 21874 paper). Before makeup, thread lubricant (aka dope) may be applied to pin 8 and the box 6. Contamination of the thread dope may lead to overturning the connection. Overturning the connection may plastically deform (aka yield) the connection, resulting in a reduction of an inner diameter of the connection and possible leaking of the connection during service. Contamination of the thread dope may occur due to rain water. Other factors that may cause yielding include incorrect makeup parameters, other environmental effects, malfunction of the measurement system, and malfunction of firmware/software. Other environmental parameters may include rain water on the connection and temperature sensitivity of the thread dope.

The shoulder position 335 is reached in shoulder region 305 evinced by rapid increase in the torque and corresponding increase in the gradient. Once the shoulder position 335 is reached, makeup of the connection 1 may continue until the dump torque 226 is reached. As rotation continues to the dump torque value 226, the connection may enter a linear elastic region 310. In this region 310, the torque may increase with an almost constant gradient as the connection experiences reversible elastic deformation. The gradient may have a nearly constant maximum value 325 in the linear region 310. As rotation continues, the connection 1 may enter a non-linear elastic range 315. In this region 315, the torque may increase non-linearly as the connection experiences partially elastic and partially plastic deformation. The gradient may decrease from the maximum in a stepwise fashion.

As rotation continues, the connection may enter a plastic region 320. In this region 320, the torque may continue to increase but at a nearly constant gradient as the connection experiences plastic deformation. The gradient may be substantially less than the maximum gradient 325 achieved in the linear region 310 and may also be less than the shoulder threshold gradient 224. The delta turns (final turns minus shoulder turns) is about 0.15 turn. The connection 1 experiences a maximum torque gradient 325 in the first half of the delta region (divided by median 340).

Figure 4B:
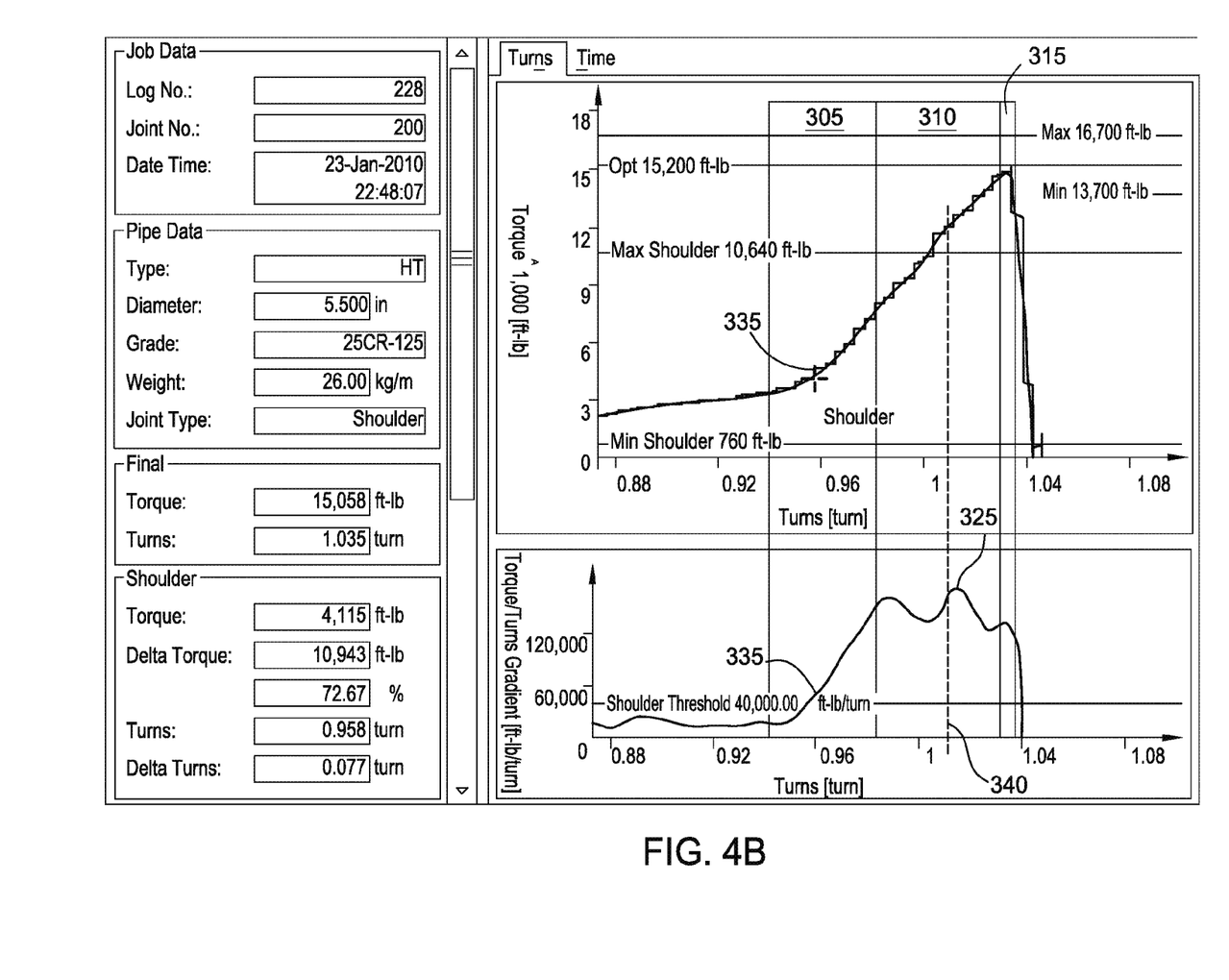
FIG. 4B illustrates an acceptable makeup shoulder connection for a connection similar to FIG. 4A.

FIG. 4B illustrates an acceptable makeup shoulder connection for a connection similar to FIG. 4A. In contrast to FIG. 4A, the delta region (between shoulder and final) is less than 0.1 turns and the connection 1 experiences the maximum gradient 325 in a second half of the delta region. A substantial portion of the linear elastic region 310 is also located in the second half of the delta region. The non-linear region 315 is substantially reduced and the plastic region 320 is non-existent.

Figure 4C:
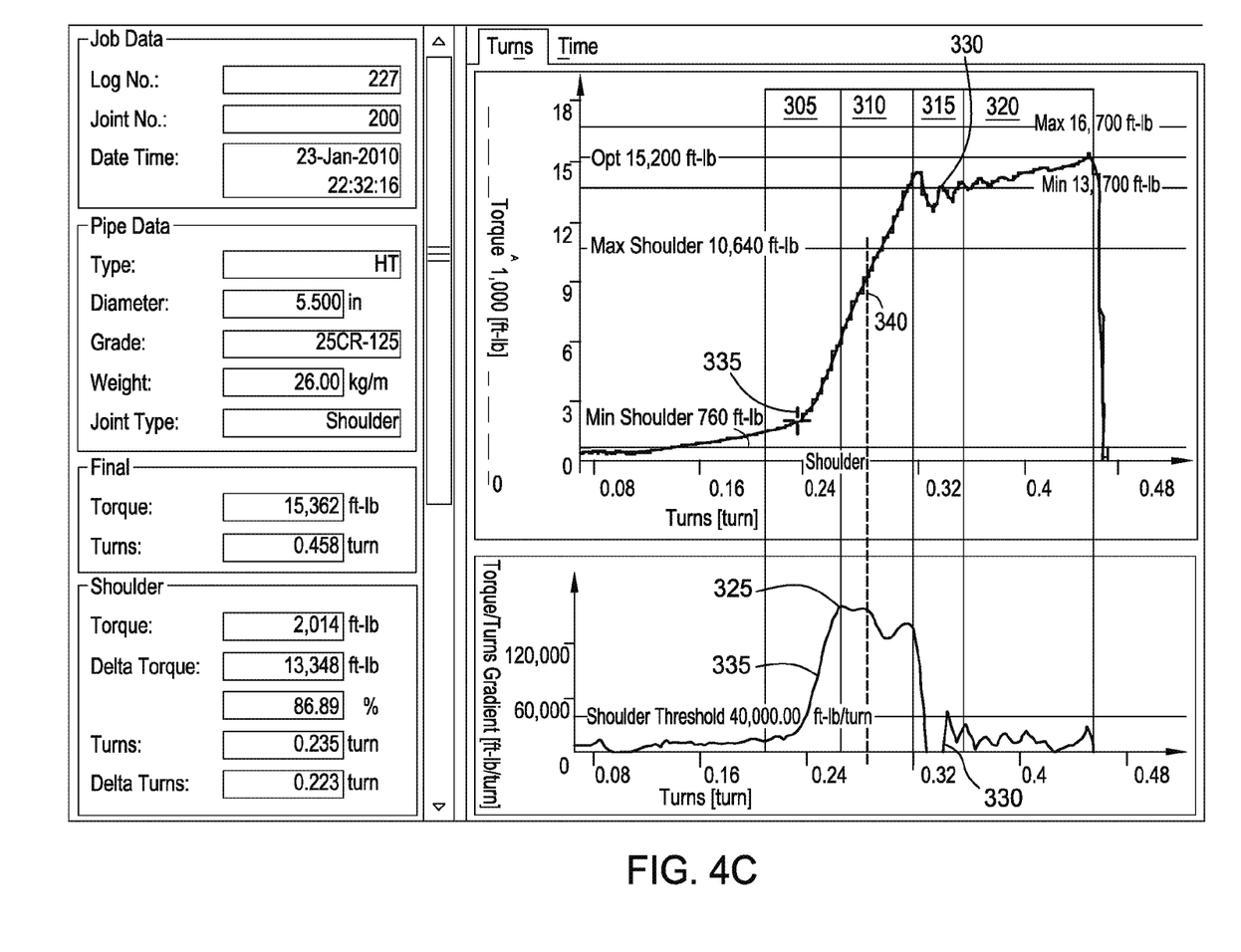
FIG. 4C illustrates yielding of another threaded premium connection similar to FIG. 4A.

FIG. 4C illustrates yielding of another threaded premium connection similar to FIG. 4A. The delta turns value is substantially greater than 0.1 turns. The maximum gradient 325 and linear elastic region 310 are each located in the first half of the delta turns region. The plastic region 320 appears at the end of the delta region. The average gradient in the plastic region 320 is substantially less than in the linear elastic region 310.

Figure 4D:
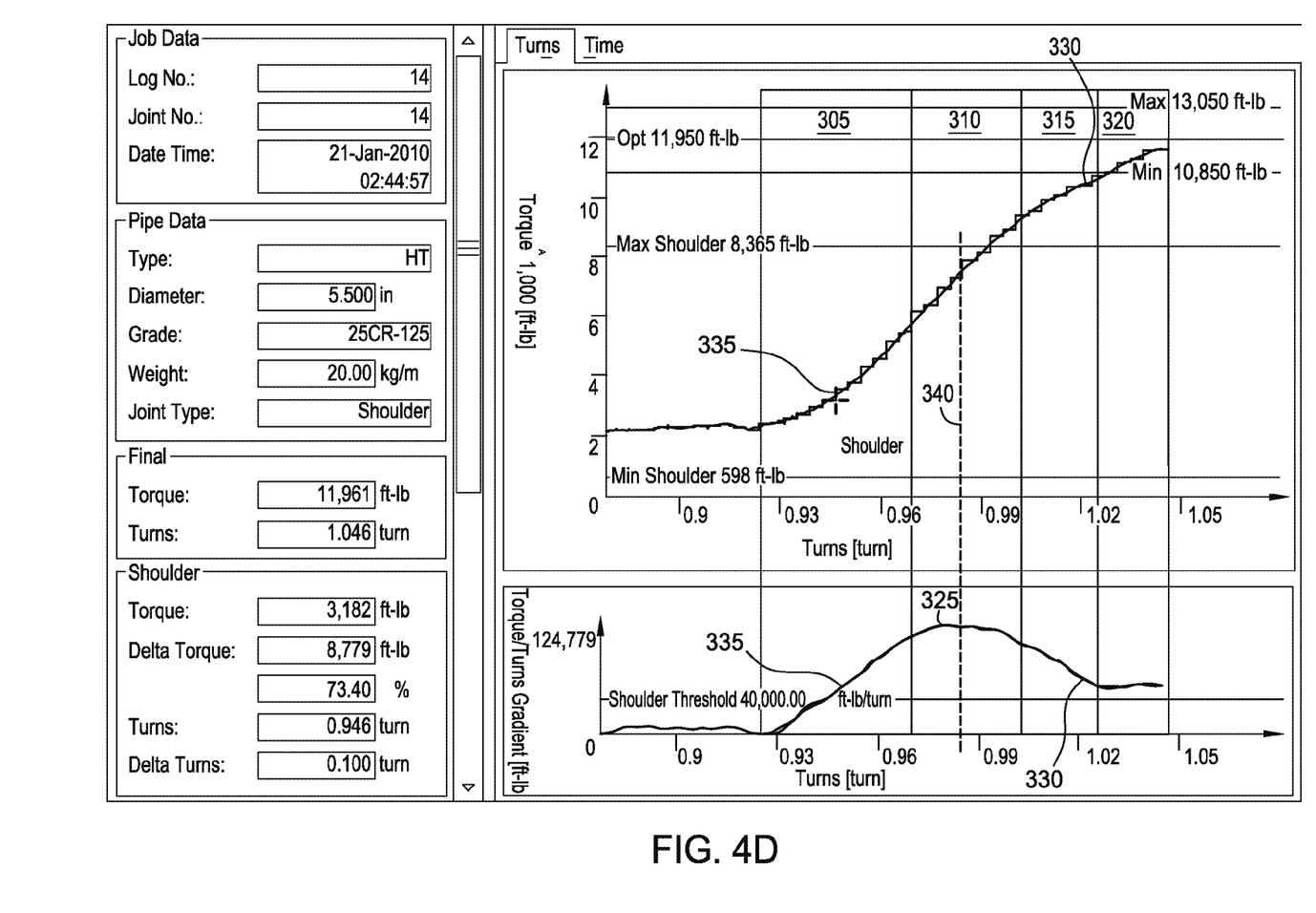
FIG. 4D illustrates yielding of another threaded premium connection different from FIG. 4A.

FIG. 4D illustrates yielding of another threaded premium connection different from FIG. 4A. The delta turns value equals 0.1 turns. The maximum gradient 325 and linear elastic region are each located in the first half of the delta region. The plastic region 320 appears at the end of the delta region. The average gradient in the plastic region 320 is substantially less than in the linear elastic region 310.

The torque gradient calculator 236 may also calculate a rate of change of the torque gradient with respect to rotation (hereinafter "yield gradient") for each paired set of torque gradient calculations. At least two calculations are needed before yield gradient calculation can be made. The smoothing algorithm 238 may operate to smooth the yield gradient (e.g., by way of a running average). The torque gradient calculator 236 may not begin the yield gradient calculation until the shoulder position 335 is detected and may iteratively calculate the yield gradient (at a frequency set by the sampler 240).

The yield detector 250 may calculate a target turns value 330 using the turns value of the shoulder position 335 and the maximum delta turns value 228. The yield detector 250 may also calculate the median 340 of the delta region using the maximum delta turns value 228. The median turns 340 may equal the shoulder turns plus one-half the maximum delta turns 228. The target turns value 330 may equal the shoulder turns plus the maximum delta turns 228. The target turns value 330 may be slightly reduced by a safety factor to account for system inertia.

As rotation of the connection continues past the shoulder position 335, the yield detector 250 may iteratively (at a frequency set by the sampler 240) monitor the yield gradient for a potential maximum of the torque gradient. The yield detector may also monitor turns. Once a potential maximum for the torque gradient is detected, the yield detector may store a first marker. The first marker may include the torque gradient and turns values corresponding to the detection of the potential maximum value. The yield detector 250 may then compare the turns value to the median turns value 340 to determine whether the potential maximum occurred in the first half or second half of the delta region. If the potential maximum is in the second half of the delta region, the yield detector 250 may shift into a passive mode (allow connection to be completed by the target detector 254). As discussed above, comparison of the turns value at the maximum torque gradient to the median turns value may provide a predictive indicator of whether the connection is susceptible to yielding.

If the potential maximum is in the first half of the delta region, the yield detector 250 may continue to monitor the yield gradient for a subsequent maximum torque gradient value indicating that the potential maximum torque gradient may not be the actual maximum torque gradient. The yield detector 250 may continue to monitor the yield gradient and the turns until the target turns value 330 is reached. If the target turns value is reached before the yield detector 250 detects a subsequent maximum torque gradient, then the yield detector may abort the connection by issuing the dump signal 222 to prevent yielding of the connection.

If a subsequent potential maximum value is detected, the yield detector 250 may store a second marker including the torque gradient and turns values corresponding to the detection of the subsequent maximum value. The yield detector 250 may then compare the subsequent torque gradient to the initial torque gradient to determine which of the gradients is the potential maximum. If the subsequent torque gradient is the potential maximum, then the yield detector 250 may then compare the turns value to the median turns value to determine whether the potential maximum occurred in the first half or second half of the delta region. If the potential maximum is in the second half of the delta region, the yield detector 250 may shift into the passive mode. If either the subsequent potential maximum is in the first half of the delta region or the initial torque gradient remains the potential maximum, then the yield detector 250 may continue to monitor for a subsequent potential maximum value. The yield detector 250 may iterate either until the target turns value 330 is reached or the yield detector shifts into the passive mode.

If the connection 1 is aborted by the yield detector 250, the connection evaluator 252 may still evaluate the connection, as discussed above. Since the yield detector 250 may abort before yielding, the connection 1 may not be damaged. The connection evaluator 252 may determine if the aborted connection 1 is still acceptable. If the connection 1 is acceptable, makeup of the tubular string 20 may continue without disassembling the connection. The plotter 232 may add the markers from the yield detector 250 to one or more of the curves 50, 50a. Alternatively or additionally, the plotter 232 may plot the yield gradient curve. The operator may evaluate the data and recommendation of the connection evaluator and make the final decision as whether the connection 1 is acceptable or not.

A target torque value may be used instead of or in addition to the target turns value 330. Alternatively or additionally, the initial potential maximum may be compared to the subsequent torque gradient and the connection aborted if the subsequent torque gradient becomes substantially less than the potential maximum, such as less than three-quarters, two-thirds, or one-half the potential maximum. Alternatively or additionally, the initial potential maximum may be compared to the subsequent torque gradient, the corresponding subsequent yield gradient compared to zero, and the connection 1 aborted if both the subsequent torque gradient is substantially less than the initial potential maximum and the corresponding subsequent yield gradient is equal to, nearly equal to, and/or less than zero. Alternatively or additionally, the connection 1 may be aborted if the torque gradient becomes less than the shoulder threshold gradient 224. Alternatively or additionally, the shoulder detector 248 may detect the shoulder position 335 by monitoring the torque differential (i.e., see discussion of FIGS. 2A and 2B, above), mark the torque differential at the shoulder position (i.e., 56a), and abort the connection 1 if the torque differential becomes less than the marked torque differential Further, the target turns and median turns formulas may include a connection specific yield factor. The connection specific yield factor may be derived theoretically, such as by finite element analysis, or empirically, such as by laboratory testing and/or analysis of historical data for a particular connection. With the yield factor, the target turns value 330 may equal the shoulder turns plus the maximum delta turns minus the yield factor. The median turns value 340 may equal the shoulder turns plus one-half the difference of the maximum delta turns and the yield factor.

In operation, the yield detector 250 may be applied to FIG. 4A as follows. Assuming a maximum delta turns 228 of 0.13 turn and a yield factor of 0.025 turn, the shoulder 335 is detected at about 0.753 turn. The yield detector 250 may then calculate the median 340 at about 0.806 turn and the target 330 at about 0.858 turn. The yield detector 250 may detect a first potential maximum torque gradient at 0.78 turn and then detect the actual maximum 325 at about 0.799 turn. The yield detector 250 may also detect the subsequent inflections in the torque gradient curve. The yield detector 250 may then abort the connection at the target 330 before yielding occurs. The connection evaluator 250 may accept the connection since the torque at the aborted target exceeds the minimum final torque.

In operation, the yield detector 250 may be applied to FIG. 4B as follows. Assuming a maximum delta turns 228 of 0.13 turn and a yield factor of 0.025 turn, the shoulder 335 is detected at 0.958 turn. The yield detector may then calculate the median 340 at 1.011 turn and the target 330 at 1.063 turns. The yield detector 250 may detect a first potential maximum at about 0.99 turn and then detect the maximum 325 at about 1.015 turn. The yield detector 250 may also detect the subsequent inflections in the torque gradient curve. The yield detector 250 may not abort the connection both since the maximum 325 is detected in the second half of the delta region and since the makeup of the connection 1 is terminated by the target detector 254 well before the target turns value 330 is reached.

In operation, the yield detector 250 may be applied to FIG. 4C as follows. Assuming a maximum delta turns 228 of 0.13 turn and a yield factor of 0.025 turn, the shoulder 335 is detected at 0.235 turn. The yield detector 250 may then calculate the median 340 at 0.288 turn and the target 330 at 0.340 turn. The yield detector 250 may detect the maximum torque gradient 325 at about 0.273 turn. The yield detector 250 may also detect the subsequent inflections in the torque gradient curve. The yield detector 250 may then abort the connection at the target 330 before yielding occurs. The connection evaluator 252 may or may not accept the connection 1 since it is unclear whether the torque at the aborted target 330 exceeds the minimum final torque 230.

In operation, the yield detector 250 may be applied to FIG. 4D as follows. Assuming a maximum delta turns of 0.13 turn and a yield factor of 0.055 turn, the shoulder 335 is detected at 0.946 turn. The yield detector 250 may then calculate the median 340 at 0.984 turn and the target 330 at 1.026 turns. The yield detector 250 may detect the maximum torque gradient 325 at about 0.979 turn. The yield detector 250 may then abort the connection at the target 330 before yielding occurs. The connection evaluator 252 may reject the connection since the torque at the aborted target 330 is less than the minimum final torque 230.

Alternatively, the tubular makeup system power drive may be a top drive instead of the tong assembly.

While the foregoing is directed to embodiments of the present invention, other and further embodiments of the invention may be devised without departing from the basic scope thereof, and the scope thereof is determined by the claims that follow.

The invention claimed is:

1. A method of connecting a first threaded tubular to a second threaded tubular, comprising:
    engaging threads of the tubulars;
    rotating the first tubular relative to the second tubular, thereby making up the threaded connection;
        monitoring for potential yielding of the threaded connection by calculating a yield gradient using the torque gradient and the turns of the first tubular; and
    terminating the makeup according to:
        a first criterion in response to detection of the potential yielding; or
        a second criterion in response to absence of the potential yielding.

2. The method of claim 1, further comprising during makeup of the threaded connection:
    detecting a shoulder position; and
    monitoring for potential yielding after detection of the shoulder position.

3. The method of claim 1, wherein:
    the potential yielding is further monitored by:
        calculating a median turns value using a turns value of the detected shoulder position and one-half of a delta turns value, and
    the method further comprises calculating a target turns value using the turns value of the detected shoulder position and a delta turns value during the makeup.

4. The method of claim 3, wherein the potential yielding is further monitored by:
    determining a first potential maximum (FPM) of the torque gradient using the yield gradient; and
    comparing a turns value of the FPM to the median turns value.

5. The method of claim 4, wherein the potential yielding is detected by:
    the FPM turns value being less than the median turns value, and
    the FPM being an actual maximum of the torque gradient.

6. The method of claim 5, wherein the potential yielding is further detected by monitoring the yield gradient for a second potential maximum (SPM) of the torque gradient to determine whether the FPM is the actual maximum.

7. The method of claim 5, further comprising:
    comparing the turns of the first tubular and the target turns value,
    wherein the first criterion is correspondence of the turns of the first tubular and the target turns value.

8. The method of claim 7, further comprising determining acceptability of the terminated connection by comparing a final torque exerted on the threaded connection to a minimum final torque value.

9. The method of claim 4, wherein:
    the absence of the potential yielding is detected by the FPM turns value being greater than the median turns value,
    the method further comprises monitoring torque exerted on the threaded connection, and
    the second criterion is correspondence of the exerted torque to a dump torque value.

10. The method of claim 1, wherein the first criterion utilizes a turns value and the second criterion utilizes a torque value.

11. The method of claim 10, wherein:
    the turns value is a target turns value, and
    the method further comprises calculating the target turns value using a turns value of the detected shoulder position and a delta turns value during the makeup.

12. The method of claim 11, wherein the torque value is a predetermined dump torque value.

13. A tubular makeup system, comprising:
    a power drive operable rotate a first threaded tubular relative to a second threaded tubular;
    a torque cell;
    a turns counter; and
    a programmable logic controller (PLC) operably connected to the power drive and in communication with the torque cell and turns counter,
    wherein the PLC is configured to control an operation, comprising:
        engaging threads of the tubulars;
        rotating the first tubular relative to the second tubular, thereby making up the threaded connection;
            monitoring for potential yielding of the threaded connection by calculating a yield gradient using the torque gradient and the turns of the first tubular; and
        terminating the makeup according to:
            a first criterion in response to detection of the potential yielding; or
            a second criterion in response to absence of the potential yielding.

14. The tubular makeup system of claim 13, wherein the power drive is a tong assembly.

15. The method of claim 2, wherein the shoulder position is detected by:
    calculating a torque gradient using torque exerted on the threaded connection and turns of the first tubular; and
    comparing the torque gradient to a shoulder threshold gradient.

16. A method of connecting a first threaded tubular to a second threaded tubular, comprising:
    engaging threads of the tubulars;
    rotating the first tubular relative to the second tubular, thereby making up the threaded connection;
    monitoring for potential yielding of the threaded connection by:
        calculating a torque gradient;
        determining a maximum torque gradient exerted on the threaded connection, and
        comparing a turns value of the maximum torque gradient to a median turns value; and
    terminating the makeup according to:
        a first criterion in response to detection of the potential yielding; or
        a second criterion in response to absence of the potential yielding.

17. The method of claim 16, wherein:
    the potential yielding is detected by the turns value of the maximum torque gradient being less than the median turns value, and
    the first criterion is correspondence of turns of the first tubular and a target turns value.

18. The method of claim 17, further comprising determining acceptability of the terminated connection.

19. The method of claim 16, wherein:
    the absence of the potential yielding is detected by the turns value of the maximum torque gradient being greater than the median turns value,
    the method further comprises monitoring torque exerted on the threaded connection, and the second criterion is correspondence of the exerted torque to a dump torque value.

20. The method of claim 16, further comprising during makeup of the threaded connection:
   detecting a shoulder position; and
   monitoring for potential yielding after detection of the shoulder position.

\* \* \* \* \*